(12) United States Patent
Mandyam et al.

(10) Patent No.: US 6,236,989 B1
(45) Date of Patent: May 22, 2001

(54) NETWORK-BASED HELP ARCHITECTURE

(75) Inventors: Sriram Srinivasan Mandyam; Shubhada Saxena, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/210,089

(22) Filed: Dec. 11, 1998

(51) Int. Cl.$^7$ .................................................... G06F 17/30
(52) U.S. Cl. ............................... 707/4; 707/500; 709/102
(58) Field of Search .......................... 707/1–10, 100–104, 707/200–206, 500–516; 345/326–333, 338; 706/46; 709/102

(56) References Cited

U.S. PATENT DOCUMENTS

| | | | |
|---|---|---|---|
| 5,542,024 | * | 7/1996 | Balint et al. .......................... 345/356 |
| 5,546,521 | * | 8/1996 | Martinez .............................. 345/338 |
| 5,784,616 | * | 7/1998 | Horvitz ................................ 709/102 |
| 5,909,679 | * | 6/1999 | Hall ....................................... 707/4 |
| 5,995,997 | * | 11/1999 | Horvitz ................................ 709/102 |
| 6,009,452 | * | 12/1999 | Horvitz ................................ 709/102 |
| 6,021,403 | * | 2/2000 | Horvitz et al. ....................... 706/45 |
| 6,026,396 | * | 2/2000 | Hall ....................................... 707/4 |
| 6,064,971 | * | 5/2000 | Hartnett ................................ 706/46 |

* cited by examiner

*Primary Examiner*—Ruay Lian Ho
(74) *Attorney, Agent, or Firm*—David A. Mims, Jr.; Felsman, Bradley, Vaden, Gunter & Dillon, LLP

(57) ABSTRACT

A method and system for implementing a network-based help architecture for software applications that reside on a host data processing system. A help database that is designed to support a software application that resides on a data processing system is integrated with an advanced knowledge base utilizing a standardized data format. The advanced knowledge base resides in a computer network to which the data processing system is linked. Next, and in response to selecting a help request associated with the software application, the help request is automatically converted into a data format readable by the computer network. Finally, the help database is dynamically supplemented and updated utilizing the advanced knowledge base, such that, in response to the step of selecting a help request associated with the software application, seamless access is provided within the computer network to the help database and the advanced knowledge base.

17 Claims, 6 Drawing Sheets

NETWORK-BASED HELP ARCHITECTURE

BACKGROUND OF THE INVENTION

1. Technical Field

The present invention relates to improved information-retrieval methods and systems. In particular, the present invention relates to a data-processing system that hosts a software application and is linked to other data-processing systems by associated linking networks. More particularly, the present invention relates to an improved method and system for providing user help information for a software application that resides on a data-processing system that may be accessed via links to other data processing systems. Still more particularly, the present invention provides a method and system for integrating help databases with knowledge bases utilizing a standardized data format such that dynamically updated help information can be efficiently accessed.

2. Description of the Related Art

Network Access to Information

The development of computerized information resources, such as the "Internet," allows users of data-processing systems to link with other servers and networks, and thus retrieve vast amounts of electronic information heretofore unavailable in an electronic medium. Such electronic information is increasingly displacing more conventional means of information transmission, such as newspapers, magazines, and even television.

The term "Internet" is an abbreviation for "Internetwork," and refers commonly to the collection of networks and gateways that utilize the TCP/IP suite of protocols, which are well-known in the art of computer networking. TCP/IP is an acronym for "Transmission Control Protocol/Internet Protocol," and is a software protocol developed by the Department of Defense for communication between computers. The Internet can be described as a system of geographically distributed computer networks interconnected by computers executing networking protocols that allow users to interact and share information over the networks. Because of such wide-spread information sharing, the Internet has thus far generally evolved into an "open" system for which developers can design software applications for performing specialized operations or services, essentially without restriction.

Electronic information transferred between data-processing networks is usually presented in hypertext, a metaphor for presenting information in a manner in which text, images, sounds, and actions become linked together in a complex nonsequential Web of associations that permit the user to "browse" or "navigate" through related topics, regardless of the presented order of the topics. These links are often established by both the author of a hypertext document and by the user, depending on the intent of the hypertext document. For example, traveling among links to the word "iron" in an article displayed within a graphical user interface in a dataprocessing system might lead the user to the periodic table of the chemical elements (i.e., linked by the word "iron"), or to a reference to the use of iron in weapons in Europe in the Dark Ages. The term "hypertext" was coined in the 1960s to describe documents, as presented by a computer, that express the nonlinear structure of ideas, as opposed to the linear format of books, film, and speech.

The term "hypermedia," on the other hand, more recently introduced, is nearly synonymous with "hypertext" but focuses on the nontextual components of hypertext, such as animation, recorded sound, and video. Hypermedia is the integration of graphics, sound, video, or any combination thereof into a primarily associative system of information storage and retrieval. Hypermedia, as well as hypertext, especially in an interactive format where choices are controlled by the user, is structured around the idea of offering a working and learning environment that parallels human thinking— that is, an environment that allows the user to make associations between topics rather than move sequentially from one to the next, as in an alphabetic list. Hypermedia, as well as hypertext topics, are thus linked in a manner that allows the user to jump from one subject to other related subjects during a search for information. Hyper-link information is contained within hypermedia and hypertext documents, which allow a user to move back to "original" or referring network sites by the mere "click" (i.e., with a mouse or other pointing device) of the hyper-linked topic.

A typical networked system that utilizes hypertext and hypermedia conventions follows a client/server architecture. The "client" is a member of a class or group that uses the services of another class or group to which it is not related. Thus, in computing, a client is a process (i.e., roughly a program or task) that requests a service provided by another program. The client process utilizes the requested service without having to "know" any working details about the other program or the service itself. In a client/server architecture, particularly a networked system, a client is usually a computer that accesses shared network resources provided by another computer (i.e., a server).

A request by a user for news or other information can be sent by a client application program to a server. A server is typically a remote computer system accessible over the Internet or other communications medium. The server scans and searches for raw (e.g., unprocessed) information sources (e.g., newswire feeds or newsgroups). Based upon such requests by the user, the server presents filtered electronic information as server responses to the client process. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by Hypertext-Transfer Protocol (HTTP). The World Wide Web (WWW) or, simply, the "Web," includes those servers adhering to this standard (i.e., HTTP) which are accessible to clients via a computer or data-processing system network address such as a Universal Resource Locator (URL) . The network address can be referred to as a Universal Resource Locator address. For example, communication can be provided over a communications medium. In particular, the client and server may be coupled to one another via Serial Line Internet Protocol (SLIP) or TCP/IP connections for high-capacity communication. Active within the client is a first process, known as a "browser," which establishes the connection with the server and presents information to the user. The server itself executes corresponding server software which presents information to the client in the form of HTTP responses. The HTTP responses correspond to "Web pages" constructed from a Hypertext Markup Language (HTML) , or other server-generated data. Each Web page can also be referred to simply as a "page."

The client and server typically display browsers and other Internet data for a user via a graphical user interface. A graphical user interface is a type of display format that enables a user to choose commands, start programs, and see lists of files and other options by pointing to pictorial representations (icons) and lists of menu items on the screen. Choices can be activated generally either with a keyboard or a mouse. Internet services are typically accessed by specifying a unique network address (i.e., URL). The URL address has two basic components, the protocol to be used and the object pathname. For example, the URL address, "http://www.uspto.gov" (i.e., home page for the U.S. Patent and Trademark Office), specifies a hypertext-transfer protocol ("http") and a pathname of the server ("www.uspto.gov") . The server name is associated with a unique numeric value (TCP/IP address).

The evolution of personal computers over the last decade has accelerated the Web and Internet toward useful everyday applications. Nearly every computer sold over the last several years has or will, at some point, become "on-line" to an Internet service provider. Somewhere between 20 and 30 million people around the globe use some form of Internet service on a regular basis. The graphical portion of the World Wide Web itself is usually stocked with more than twenty-two million "pages" of content, with over one million new pages added every month.

Free or relatively inexpensive computer software applications such as Internet "search engines" make it simple to track down sites where an individual can obtain information on a topic of interest. A person may type in a subject or key word and generate a list of network sites (i.e., Web sites). Thus, with "home pages" published by thousands of companies, universities, government agencies, museums, and municipalities, the Internet can be an invaluable resource. With a little practice, even new users can skim millions of Web pages or thousands of newsgroups, not only for topics of general interest, but also to access precise bits of data. The market for Internet access and related applications is explosive and is growing faster than expected, doubling in size approximately every three months.

Existing Help Architecture for Software Applications

Typically, software applications offer a basic level of support through a built-in Help Package that provides answers to simple usage problems. However, when application users encounter complex problems, they are referred to a Customer Solution Center that has access to a knowledge base containing solutions for such problems. This is primarily due to the fact that application developers cannot predetermine such complex situations and therefore do not include them into the Help Package. The term "help package" will be utilized hereinafter in association with a software application and will to refer to a set of instructions provided by a software manufacturer that provide fundamental guidance for users of the software application.

In order to support the application's rich functionality, Help Packages, in some cases are as large as the application itself. While the price of storage devices, such as hard disk drives, is gradually falling, the number of applications stored in such devices and the space (swap space) required to manage these applications is also growing at an exponential rate. As a result, it is imperative to allocate storage space for more frequently accessed data than the Help Package.

Every application available today is equipped with a standard help package that is accessed when a user "clicks" on the application's 'Help' button. For example, there is a standard 'Help' button in every window frame generated by a Windows application. Each 'Help' button provides assistance on the data/function contained in its window. The data itself is stored in a 'name.hlp' file where 'name' is the name associated with the information being accessed. In the current scheme, an application loads the Help file whenever a user clicks on the 'Help' button. The user is then able to maneuver through this file to get the required help information. In cases where it is not possible to resolve a problem through the above mentioned help mechanisms, the user either calls a Help Desk agent in his/her organization or a customer service representative at the manufacturer's site.

Applications are growing in complexity due to their increased functional capability. The help package provided with these applications is frequently insufficient to resolve complex issues created by these applications. Solutions based-on knowledge packs are growing in popularity as they provide answers to complex problems. These knowledge bases are built by third party vendors by converting Help Desk problem reports into a knowledge base and then shipping them to various customers. The knowledge bases can be installed on a Web server at the customer's site and accessed by the user though an HTML browser. Each knowledge base is an application help database which can be accessed through sophisticated search mechanisms. Knowledge base developers enter into a service agreement with their customers to provide periodic updates (CD ROM) to the help database.

There are three key issues that have not been adequately addressed in the existing help architecture. The first of these issues is that, in standard help application packages, the information provided is static and contains what the product developer thought would be sufficient for the user. There is no dynamic mechanism available for the product developer to monitor and improve the application or the help package without shipping update disks. Another problem with existing help architectures relates to the aforementioned knowledge bases. Though knowledge bases are effective for solving complex problems; however, these products have to be accessed and searched through an independent mechanism. In addition, these bases require frequent maintenance (updates from the supplier) by the customer.

Finally, while the price of storage devices, such as hard disk drives, is gradually falling, the number of complex applications stored in such devices and the space (swap space) required to manage these applications are also growing at an exponential rate. It is imperative to use the disk space for more frequently accessed date rather than the data in a help package.

At the time of application development, developers can only anticipate potential problem areas in each application. As a result, application help packages do not provide detailed help to address complex situations. These complex situations may prove very costly, requiring intensive Help Desk support and frequent application updates to the customer. As an alternative, application developers can tap into a dynamically accumulating knowledge database and observe these complex situations ahead of time. These complex situations can be analyzed to make changes in the application design or provide more detailed help in future releases of the application. Developers who already offer a version of the standard help package (see above) from their Web site can now make updates immediately available to the customer. Customers can also periodically download these updated packages and refresh their local version of the package.

From the foregoing, it can be seen that a need exists for a method and system to provide help information readily and easily to a user in an efficient manner. A solution to the aforementioned problem would save a software user time and energy in searching separate and independent mechanisms for needed help information. A method and system that allow a user the opportunity to utilize a centralized application launched over the Internet and directly consult help information would provide the user access to comprehensive and dynamically updated help information.

SUMMARY OF THE INVENTION

It is therefore an object of the invention to provide an improved information-retrieval method and system.

It is another object of the invention to provide a data-processing system that hosts a software application and is linked to other data-processing systems by associated linking networks.

It is still another object of the invention to provide an improved method and system for providing user help information for a software application that resides on a data-processing system that may be accessed via links to other data processing systems.

It is a further object of the invention to provide a method and system for integrating help databases with knowledge bases utilizing a standardized data format such that dynamically updated help information can be efficiently accessed.

The above and other objects are achieved as is now described. A method and system are disclosed for implementing a network-based help architecture for software applications that reside on a host data processing system. According to the present invention, a help database that is designed to support a software application that resides on a data processing system is integrated with an advanced knowledge base utilizing a standardized data format. The advanced knowledge base resides in a computer network to which the data processing system is linked. Next, and in response to selecting a help request associated with the software application, the help request is automatically converted into a data format readable by the computer network. Finally, the help database is dynamically supplemented and updated utilizing the advanced knowledge base, such that, in response to the step of selecting a help request associated with the software application, seamless access is provided within the computer network to the help database and the advanced knowledge base.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

The method and system of the present invention harness the capability of existing technology such as the Web, servers, networks, tools and applications to provide a standards-based help architecture called Web Help Architecture (WHA). In addition, the architecture's flexibility provides a variety of support/service business opportunities for both application developers and I/T organizations. This architecture, in conjunction with the standards developed by the Customer Service Consortium (CSC), will reduce the cost of developing and maintaining applications.

Current application help packages consume space and require installation on every machine that hosts the application. This problem can be eliminated by first migrating the entire help package to a HTML base and installing it on a Web Server. Each 'Help' button in the application now points to a particular HTML help file residing on the server.

When a user "clicks" on the 'help' button in a particular application window, a Web browser is immediately launched (if it is not already running) and the required help files are displayed. Since the help package resides on a server, users only need to install the client application on their machines.

The user's Web Server name is not known at the time of the help package development, a HTTP base path name is required to be input when the application is installed. This HTTP path name contains the base path (including the Web Server Internet name) to the help package installed on the Web Server. Customer satisfaction conscious manufacturers can install a version of the help package on their own Web sites and provide a default HTTP path name in the package. This will allow application users with Internet access (no local Web Servers) to get help from the manufacturer's site.

Figure 1:
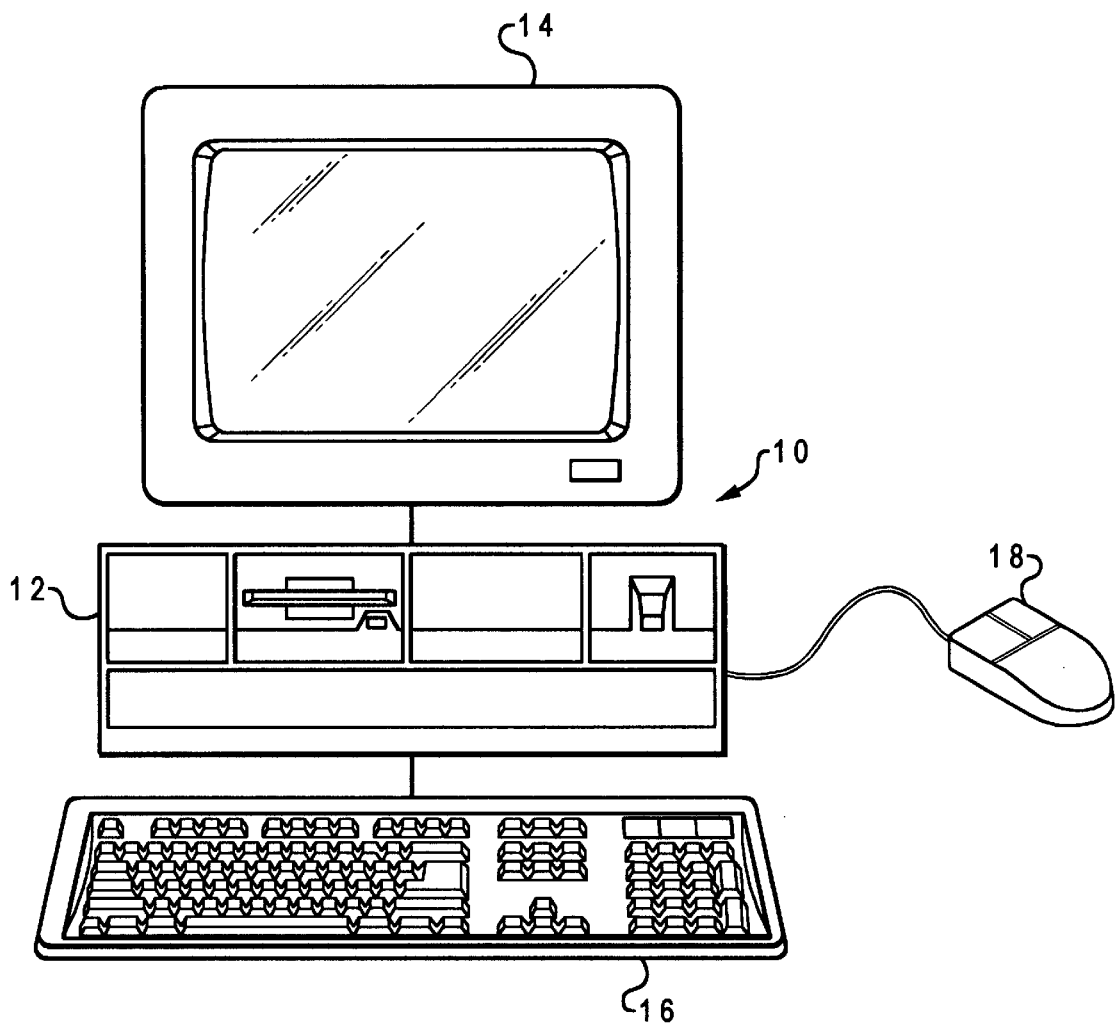
FIG. 1 is a pictorial representation of a data-processing system which can be utilized to implement the method and system of the present invention.

With reference now to the figures and, in particular, with reference to FIG. 1, there is depicted a pictorial representation of a data-processing system in which the present invention may be implemented in accordance with a preferred embodiment of the present invention. A personal computer 10 is depicted which includes a system unit 12, a video display terminal 14, an alphanumeric input device (i.e., keyboard 16) having alphanumeric and other keys, and a mouse 18. An additional input device (not shown), such as a trackball or stylus, also can be included with personal computer 10. Computer 10 can be implemented utilizing any suitable computer, such as an IBM Aptiva computer, a product of International Business Machines Corporation, located in Armonk, N.Y. "Aptiva" is a registered trademark of International Business Machines Corporation.

Although the depicted embodiment involves a personal computer, a preferred embodiment of the present invention may be implemented in other types of data-processing systems, such as, for example, intelligent workstations or mini-computers. Computer 10 also preferably includes a graphical user interface that resides within a machine-readable media to direct the operation of computer 10. Computer 10 also can be implemented utilizing any suitable computer, such as the IBM RISC/6000 computer, a product of International Business Machines Corporation, located in Armonk, N.Y. "RISC SYSTEM/6000" is a trademark of International Business Machines Corporation, and also can be referred to as the "RS/6000."

Figure 2:
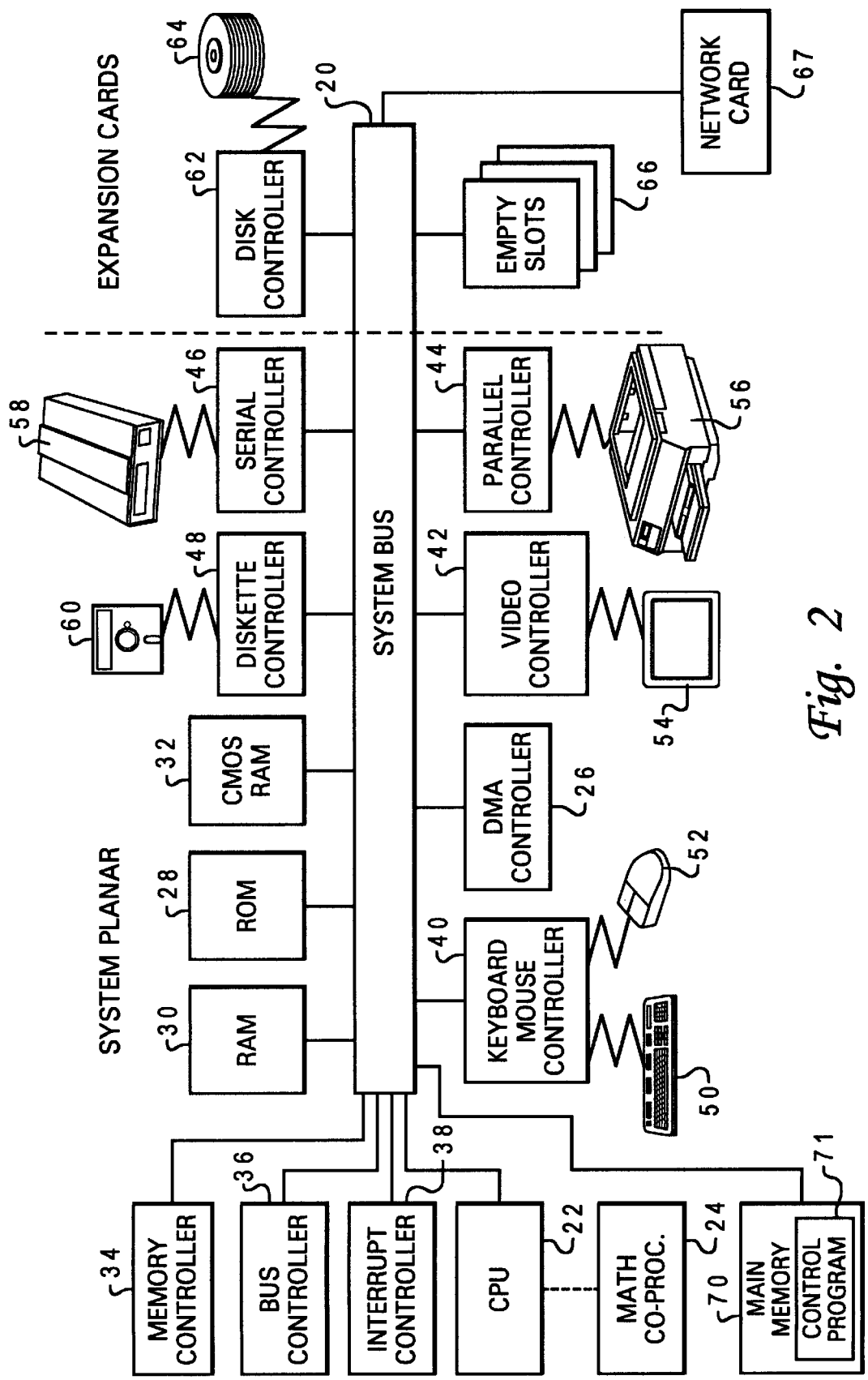
FIG. 2 is a block diagram illustrative of selected components in a personal computer system which can be utilized to implement the method and system of the present invention.

Referring now to FIG. 2 there is depicted a block diagram of selected components in personal computer 10 of FIG. 1 in which a preferred embodiment of the present invention may be implemented. Personal computer 10 of FIG. 1 preferably includes a system bus 20, as depicted in FIG. 2. System bus 20 is utilized for interconnecting and establishing communication between various components in personal computer 10. Microprocessor or central processing unit (CPU) 22 is connected to system bus 20 and also may have numeric co-processor 24 connected to it. Direct memory access ("DMA") controller 26 also is connected to system bus 20 and allows various devices to appropriate cycles from CPU 22 during large input/output ("I/O") transfers. Read-only memory ("ROM") 28 and random-access memory ("RAM") 30 are also connected to system bus 20. ROM 28 is mapped into the microprocessor 22 address space in the range from 640K to 1 megabyte. CMOS RAM 32 is attached to system bus 20 and contains system-configuration information. Any suitable machine-readable media may retain the graphical user interface of computer 10 of FIG. 1, such as RAM 30, ROM 28, a magnetic diskette, magnetic tape, or optical disk.

Also connected to system bus 20 are memory controller 34, bus controller 36, and interrupt controller 38 which serve to aid in the control of data flow through system bus 20 between various peripherals, adapters, and devices. System unit 12 of FIG. 1 also contains various I/O controllers, such as those depicted in FIG. 2: keyboard and mouse controller 40, video controller 42, parallel controller 44, serial controller 46, and diskette controller 48. Keyboard and mouse controller 40 provide a hardware interface for keyboard 50 and mouse 52. Video controller 42 provides a hardware interface for video display terminal 54. Parallel controller 44 provides a hardware interface for devices, such as printer 56. Serial controller 46 provides a hardware interface for devices, such as a modem 58. Diskette controller 48 provides a hardware interface for floppy-disk unit 60. Other technologies also can be utilized in conjunction with CPU 22, such as touch-screen technology or human voice control.

Main memory 70 is connected to system bus 20, and includes a control program 71. Control program 71 resides within main memory 70 and contains instructions that when executed on CPU 22 carry out the operations depicted in the logic flowchart of FIG. 7 described herein. The computer program product also can be referred to as a program product. Control program 71 can support a number of Internet-access tools including, for example, an HTTP-compliant Web "browser." Known browser software applications include: Netscape Navigator® ("Netscape"), Mosaic, and the like. Netscape, in particular, provides the functionality specified under HTTP. "Netscape" is a trademark of Netscape, Inc. Mosaic-brand browser is available from the National Center for Supercomputing Applications (NCSA) in Urbana-Champaign, Illinois. The present invention is designed to operate with any of these known or developing Web browsers, in order to achieve the display of help information associated with applications launched from the Internet. Control program 71 also can support other Internet services, such as the file-transfer protocol (FTP) service, which facilitates the transfer and sharing of files across the Internet. Control program 71 can further support Internet services, such as remote terminal access (Telnet), which allows users to log onto computers coupled to the network. In addition, control program 71 additionally can support services, such as simple mail-transfer protocol (SMTP) or e-mail, and network news-transfer protocol (NNTP) or "Usenet," well-known in the art of computer networking.

It is important to note that, while the present invention has been (and will continue to be) described in the context of a fully functional computer system, those skilled in the art can appreciate that the present invention is capable of being distributed as a program product in a variety of forms and that the present invention applies equally regardless of the particular type of signal-bearing media utilized to actually carry out the distribution. Examples of signal-bearing media include: recordable-type media, such as floppy disks, hard-disk drives and CD ROMs, and transmission-type media, such as digital and analog communication links.

Expansion cards also may be added to system bus 20, such as disk controller 62, which provides a hardware interface for hard-disk unit 64. Empty slots 66 are provided so that other peripherals, adapters, and devices may be added to system unit 12 of FIG. 1. A network card 67 additionally can be connected to system bus 20 in order to link system unit 12 of FIG. 1 to other data-processing system networks in a client/server architecture or to groups of computers and associated devices which are connected by communications facilities. Those skilled in the art will appreciate that the hardware depicted in FIG. 2 may vary for specific applications. For example, other peripheral devices, such as: optical-disk media, audio adapters, or chip-programming devices, such as PAL or EPROM programming devices and the like also may be utilized in addition to or in place of the hardware already depicted. Note that any or all of the above components and associated hardware may be utilized in various embodiments. However, it can be appreciated that any configuration of the aforementioned system may be used for various purposes according to a particular implementation.

Figure 3:
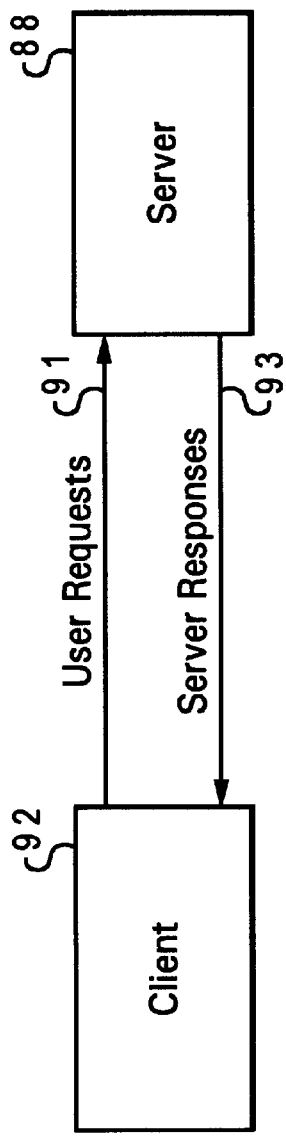
FIG. 3 is a block diagram illustrative of a client/server architecture which can be utilized to implement the method and system of the present invention.
Figure 4:
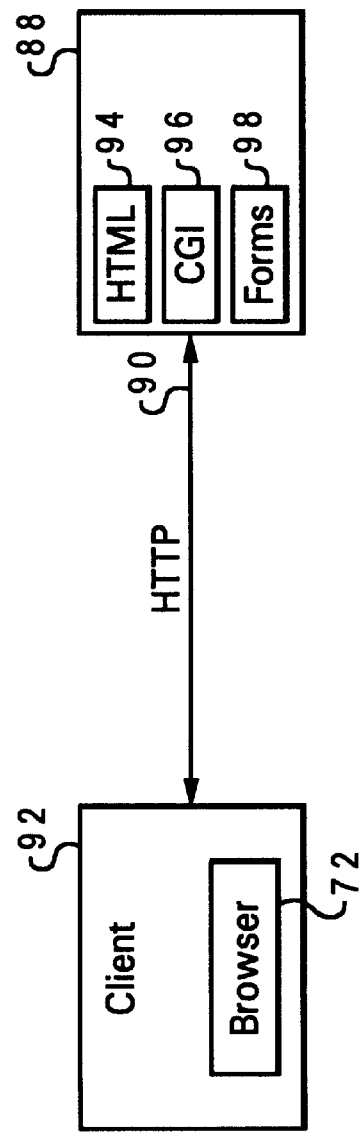
FIG. 4 is a detailed block diagram depicting a client/server architecture that may be utilized to implement the method and system of the present invention.
Figure 5:
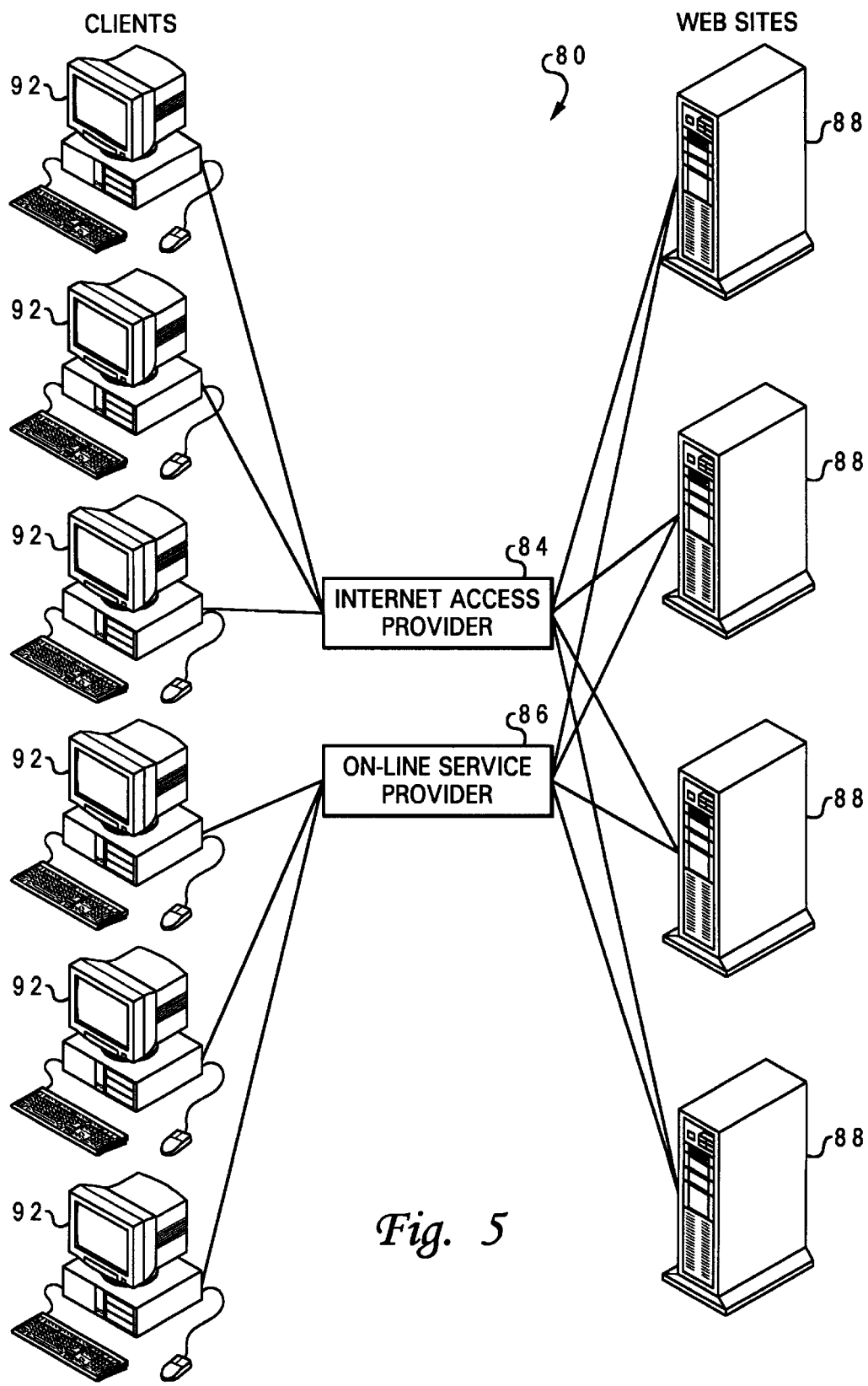
FIG. 5 is a diagram illustrative of a computer network on which the method and system of the present invention may be implemented.

In FIG. 3, FIG. 4, and FIG. 5, like parts are indicated by like reference numerals. FIG. 3 illustrates a block diagram illustrative of a client/server architecture which can be utilized in accordance with the method and system of the present invention. In FIG. 3, user requests 91 for news are sent by a client application program 92 to a server 88. Server 88 can be a remote computer system accessible over the Internet or other communications medium. Server 88 performs scanning and searching of raw (e.g., unprocessed) information sources (e.g., newswire feeds or newsgroups) and, based upon these user requests, presents the filtered electronic information as server responses 93 to the client process. The client process may be active in a first computer system, and the server process may be active in a second computer system and communicate with the first computer system over a communications medium, thus providing distributed functionality and allowing multiple clients to take advantage of the information-gathering capabilities of the server.

FIG. 4 illustrates a detailed block diagram of a client/server architecture which can be utilized in accordance with the method and system of the present invention. Although the client and server are processes which are operative within two computer systems, these processes being generated from a high-level programming language (e.g., PERL), which is interpreted and executed in a computer system at run-time (e.g., a workstation), it can be appreciated by one skilled in the art that they may be implemented in a variety of hardware devices, either programmed or dedicated.

Client 92 and server 88 communicate using the functionality provided by Hypertext-Transfer Protocol (HTTP) The term Web, as utilized herein, includes all servers adhering to the HTTP standard, which are accessible to clients via a Universal Resource Locator. Active within client 92 is a first process, browser 72, which establishes the connections with server 88, and presents information to the user. Any number of commercially or publicly available browsers may be used, in various implementations.

Server 88 executes the corresponding server software which presents information to the client in the form of HTTP responses 90. The HTTP responses 90 correspond with the Web pages represented using Hypertext Markup Language (HTML) or other data which is generated by the server. For example, under the Mosaic-brand browser, in addition to HTML functionality 94 provided by server 88 (i.e., display and retrieval of certain textual and other data based upon hypertext views and selection of item(s)), a Common Gateway Interlace (CGI) 96 is provided which allows the client program to direct server 88 to commence execution of a specified program contained within server 88. This may include a search engine which scans received information in the server for presentation to the user controlling the client. Using this interface, and HTTP responses 90, the server may notify the client of the results of that execution upon completion.

FIG. 5 is a diagram illustrative of a computer network on which the method and system of the present invention may be implemented. Computer network 80 is representative of the Internet, a known computer network based on the client-server model discussed earlier. Conceptually, the Internet includes a large network of servers 88 which are accessible by clients 92, typically users of personal computers, through some private Internet-access provider 84 (e.g., such as Internet America) or an on-line service provider 86 (e.g., such as America On-Line, Prodigy, Compuserve, and the like). Each of the clients 92 may run a "browser," which is a known software tool used to access servers 88 via the access providers. Each server 88 operates a so-called Web site which supports files in the form of documents and pages. A network path to servers 88 is identified by a Universal Resource Locator having a known syntax for defining a network collection.

Web-based Help Architecture

In order to reduce the cost of integrating and accessing knowledge-based solutions, a Customer Service Consortium (CSC) consisting of major software companies was recently formed. The CSC focuses on transforming from a call-centered to a solution-centered model by leveraging people and the knowledge bases they create.

One of CSC's main goals is to make all service and solution tools adopt a common language and data format. To indicate their commitment to this effort, the CSC members have defined a Service Incident Standard (SIS) and a Solution Exchange Standard (SES). The SIS defines a canonical data format to represent problem/incident reports. The SES defines a canonical data format to represent solutions/ knowledge. Defining a standard data format provides the ability for tools (from a variety of vendors) to share incident and solution data in a seamless manner.

Figure 6:
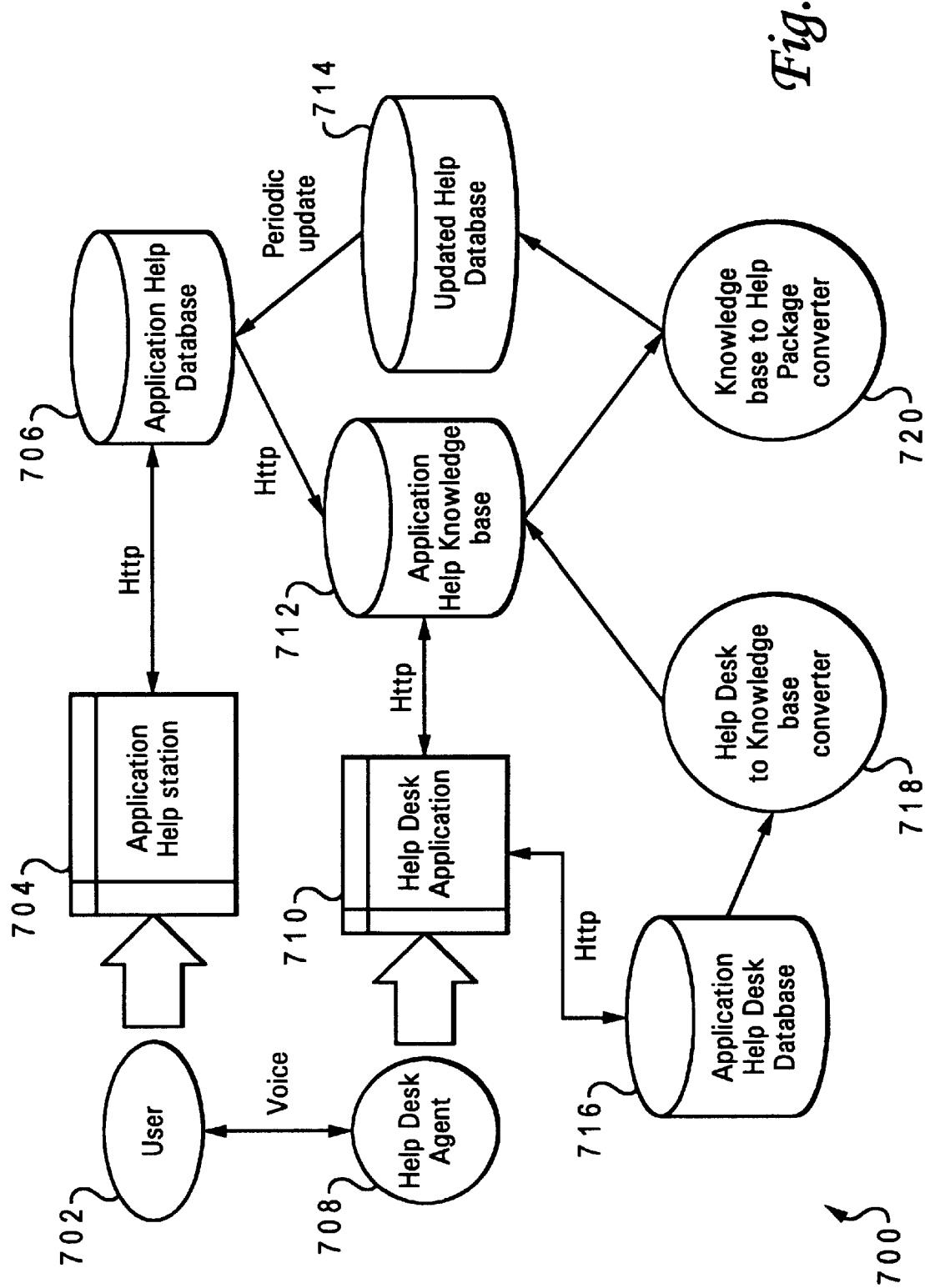
FIG. 6 is a block diagram depicting a server-centric help package deployment scheme in which user help packages are dynamically updated and integrated with knowledge packs in accordance with the method and system of the present invention.

Based on the capabilities of the World Wide Web and the data formats defined by the CSC, a solution-centered architecture is proposed that leverages knowledge and skills involved in the delivery of applications services. FIG. 6 shows the proposed Web-based Help Architecture (WHA) where an application's help data actually resides on the support and services Web site of either the user or the product developer. The WHA consists of three key solutions:

Current implementations of knowledge bases are independent from the standard help package supplied by the application developer. By providing an option to integrate the application help package with the knowledge base users obtain seamless access to both packages through the application's help window. This new feature requires modifications to the application's standard help package.

The integrated standard help package will offer both "regular" and "advanced" help functions. Each HTML help page from the application's standard help package already contains highlighted keywords. Users can obtain advances help by selecting one or more of these keywords in conjunction with the advanced help function. The selected keywords become inputs to the sophisticated search mechanism provided by the knowledge base. Based on the input keywords the knowledge base application displays the required help information through the user's Web browser.

With the integrated solution, knowledge base developers have the option of providing manual updates (CD ROM) to a static database installed at the customers site, or, offer a more dynamic scheme where customers link into a database at the knowledge base developer's site. While the former requires the developer to mail CD ROM updates to each customer, the latter provides customers with instantaneous access to the latest knowledge database. In either case, customers enter into an annual service agreement with the knowledge base developer.

In order to reduce the cost of integrating and accessing application help information, a Customer Service Consortium (CSC) consisting of major software companies was recently formed. The CSC focuses on transforming from a call-centered to a solution-centered model by leveraging people and the knowledge bases they create. One of CSC's main goals is to make all service and solution tools adopt a common language and data format. To indicate their commitment to this effort, the CSC members have defined a Service Incident Standard (SIS) and a Solution Exchange Standard (SES). The SIS defines a canonical data format to represent problem/incident reports. The SES defines a canonical data format to represent solutions/knowledge. Defining a standard data format provides the ability for tools (from a variety of vendors) to share incident and solution data in a seamless manner.

Turning now to FIG. 6, there is depicted a block diagram of a server-centric help package deployment scheme in which user help packages are dynamically updated and integrated with knowledge bases in accordance with the method and system of the present invention. A user 702 initiates operation of the WHA by first activating an application help button 704. The user initiation can be accomplished through a variety of user interface devices such as keyboard 16 or mouse 18 of computer system 10. In one embodiment of the present invention, application help button 704 is displayed within a graphical user interface (GUI) such as GUI window 104. Upon activation of application help button 704, the user's help request is converted into a hypertext data format and the newly converted hypertext help request is transmitted to an application help database 706.

Application help database 706 is periodically updated via updated help database 714 from advanced knowledge database 712. To provide flexibility among manufactures of software application products and knowledge base vendors, standardized data formats (not explicitly depicted) are utilized. Therefore, a knowledge data base-to-help package converter 720 is utilized to convert the data format utilized in advanced knowledge database 712 to a predefined standard format utilized in updated help database 714. The periodic updates from updated help database 714 to application help database 706 may occur in response to, or independent from a request by user 702 for help.

As depicted in FIG. 6, advanced knowledge base 712 is updated directly or indirectly in response to help requests. In one such scenario, user 702 attempts to obtain help via application help button 704. If the information sought by user 702 is currently unavailable within application help database 706, user 702 may then launch an advanced search request by activating an "advanced search" option within GUI 104. This advanced search request will be automatically converted as usual into a hypertext data format and forwarded from application help database 706 to advanced knowledge base 712. If the requested information is not currently within advanced knowledge base 712 or is otherwise deemed insufficient by user 702, user 702 may select a flag (not depicted) within GUI 104 which will then be automatically forwarded to advanced knowledge base 712 and automatically relayed to a help desk 710. The entity that oversees help desk 710, whether it be the software package manufacturer or a third party vendor, will then take note of the flag received at help desk 710 and update advanced knowledge base 712 accordingly.

As discussed previously with regard to updating application help database 706, a standard data format is again advantageous since the entity overseeing help desk 710 may utilize a different data format than that utilized by the vendor maintaining advanced knowledge base 712. Therefore, in one embodiment of the present invention, the update from help desk 710 in response to the aforementioned flag, may be first transmitted in a hypertext format to a help desk database 716. At help desk database 716, the pertinent information contained within the flag is then converted at help desk-to-knowledge base converter 718 into a predetermined standardized data format. The updated data within advanced knowledge base 712 is therefore in a suitable format to be accessed by a user (utilizing the "advanced search" feature within GUI 104) even before a periodic update of application help database 706 has occurred. The present invention also permits user 702 to elect to contact a help desk agent 708 thereby utilizing the advantages of a direct two-way voice conversation to accomplish the same outcome as described above in reference to setting the flag from GUI 104.

Figure 7:
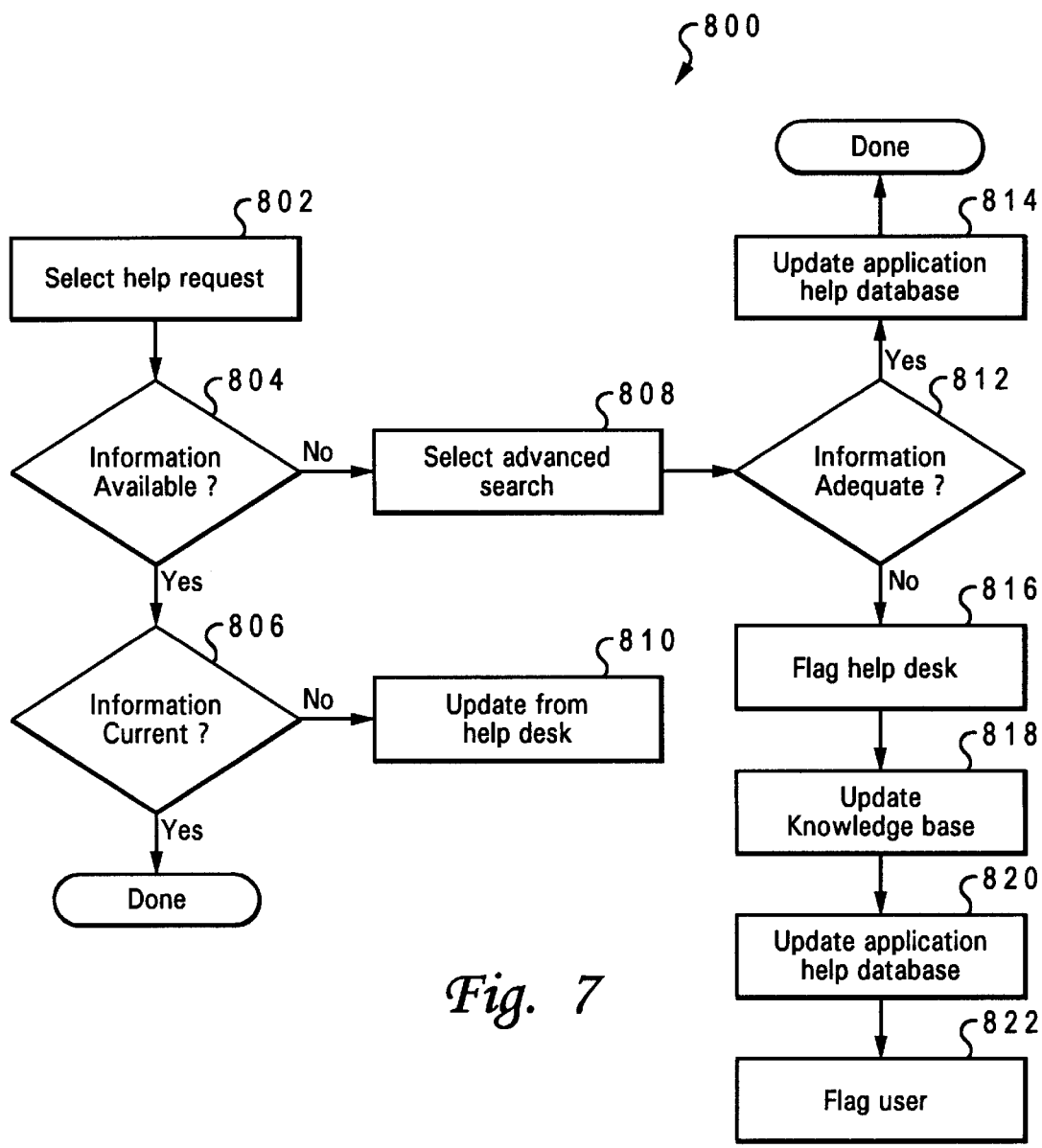
FIG. 7 is a flowchart illustrating the operations of the block diagram of FIG. 6 for providing dynamically updated help information in accordance with the method and system of the present invention.

Turning now to FIG. 7, wherein is depicted a flowchart 800 illustrating the operations of the block diagram of FIG. 6 for providing dynamically updated help information in accordance with the method and system of the present invention. As illustrated in flowchart 800, the process begins at step 802 which depicts a help request selected by a user of a software application. Following step 802 is step 804 which illustrates a determination of whether the information sought by the user as depicted at step 802 is immediately available in a help database such as application help database 706. If the information sought is available a verification of currency of the information may be performed as illustrated at step 806. In the case that the information is available but is not current, then, as depicted at step 810, a help desk support entity such as help desk application 710 may be utilized to update application help database 706.

If the information that was originally sought as depicted at step 802 is not available, then, as depicted at step 808 an advanced search mechanism is automatically selected. This advanced search mechanism is depicted in FIG. 6 as advanced knowledge base 712. If the resulting search of advanced knowledge base 712 yields adequate information, then, as illustrated at step 812, application help database 706 is automatically updated. If the search of advanced knowledge base 712 results in inadequate information, then, as depicted at step 816, a help desk entity is informed. This help desk entity may be one of several possible entities including help desk 710. Since the required help information is either not available or is incomplete at advanced knowledge base 712, the user who originally sent the help request as depicted at step 802 may not immediately receive the desired help information. As discussed previously in connection with advanced knowledge bases, information is accumulated over time to update such knowledge bases. Step 818 illustrates a generalized representation of such an update process in which the original request for help information is addressed in order to update advanced knowledge base 712 as depicted at step 818 and in turn to update application help database 706 as illustrated at step 820. As a user-friendly option, and as depicted at step 822 a message may be sent to the user notifying him or her of the status of his or her request for help.

Preferred implementations of the invention include implementations as a computer system programmed to execute the method or methods described herein, and as a program product. According to the computer system implementation, sets of instructions for executing the method and methods are resident in RAM of one or more computer systems configured generally as described above. Until required by the computer system, the set of instructions may be stored as a computer-program product in another computer memory, for example, in a disk drive (which may include a removable memory such as an optical disk or floppy disk for eventual utilization in disk drive).

The computer-program product can also be stored at another computer and transmitted when desired to the user's workstation by a network or by an external communications network. One skilled in the art can appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements. Thus, a method for implementing the steps depicted in FIG. 7, can be accomplished with a computer-aided device. In such a method, data stored in a memory unit of a data-processing system such as a data-processing system, can represent steps in a method for implementing a preferred embodiment of the present invention.

While the invention has been particularly shown as described with reference to a preferred embodiment, it will be understood by those skilled in the art that various changes in form and detail may be made therein without departing from the spirit and scope of the invention. For example, the present invention is applicable to other communication networks besides the Internet, including "intranets" (i.e., networks internal to particular organizations). It is therefore contemplated that such modifications can be made without departing from the spirit or scope of the present invention as defined in the appended claims.

What is claimed is:

1. A method of implementing a network-based help architecture for software applications that reside on a host data processing system, said method comprising the steps of:

integrating a help database with an advanced knowledge base utilizing a standardized data format, said advanced knowledge base residing in a computer network, said help database designed to support a software application resident on a data processing system, said host data processing system linked to said computer network;

in response to selecting a help request associated with said software application, automatically converting said help request into a data format readable by said computer network; and dynamically supplementing and updating said help database utilizing said advanced knowledge base, such that, in response to said step of selecting a help request associated with said software application, seamless access is provided within said computer network to said help database and said advanced knowledge base.

2. The method of claim 1 wherein said computer network utilizes a hypertext data format and wherein said step of, in response to selecting a help request associated with said software application, automatically converting said help request into a data format readable by said computer network, is performed utilizing said hypertext data format.

3. The method of claim 1 wherein said help database and said advanced knowledge base reside on a network server, said network server residing on said computer network and wherein the step of dynamically supplementing and updating said help database utilizing said advanced knowledge base, is performed utilizing said network server.

4. The method of claim 3 further comprising the step of:
installing said help package as an HTML help file on said network server.

5. The method of claim 4 further comprising the step of:
launching said help request via an application help button, said application help button residing on said data processing system, said application help button including a HTTP pathname.

6. The method of claim 1 where in the step of, in response to selecting a help request associated with said software application, automatically converting said help request into a data format readable by said computer network, comprises the steps of:
selecting a help request resident on a graphical user interface, said graphical user interface residing on a display device within said data processing system;
launching said selected help request from said data processing system; and
automatically converting said help request into a hypertext data format.

7. The method of claim 1 wherein said step of dynamically supplementing and updating said help database is performed periodically.

8. The method of claim 1 wherein said step of dynamically supplementing and updating said help database is performed in response to a user request.

9. An information handling system for implementing a network-based help architecture for software applications that reside on a host data processing system, said information handling system comprising:
means for integrating a help database with an advanced knowledge base utilizing a standardized data format, said advanced knowledge base residing in a computer network, said help database designed to support a software application resident on a data processing system, said host data processing system linked to said computer network;
means for, in response to selecting a help request associated with said software application, automatically converting said help request into a data format readable by said computer network; and
means for dynamically supplementing and updating said help database utilizing said advanced knowledge base, such that, in response to said step of selecting a help request associated with said software application, seamless access is provided within said computer network to said help database and said advanced knowledge base.

10. A computer network system for providing access to comprehensive help information for resident software applications, said computer network system comprising:
a help button associated with a software application, said help button residing on a data processing system that hosts said software application, said data processing system linked to a communications network, said communications network including a plurality of network servers;
an application help database residing on one of said plurality of network servers;
an advanced knowledge base residing on one of said plurality of network servers; and
means for utilizing said advanced knowledge base to supplement and automatically update said application help database, such that said help button may have seamless access to both said application help database and said advanced knowledge base.

11. The computer network system of claim 10 wherein said means for utilizing said advanced knowledge base to supplement and automatically update said application help database is a standardized data format, said standardized data format utilized by said application help database and said advanced knowledge base.

12. A computer program product stored in signal bearing media for implementing a network-based help architecture for software applications that reside on a host data processing system, said computer program product comprising:
instruction means stored in signal bearing media for integrating a help database with an advanced knowledge base utilizing a standardized data format, said advanced knowledge base residing in a computer network, said help database designed to support a software application resident on a data processing system, said host data processing system linked to said computer network;
instruction means stored in signal bearing media for, in response to selecting a help request associated with said software application, automatically converting said help request into a data format readable by said computer network; and
instruction means stored in signal bearing media for dynamically supplementing and updating said help database utilizing said advanced knowledge base, such that, in response to said selecting a help request associated with said software application, seamless access is provided within said computer network to said help database and said advanced knowledge base.

13. The computer program product of claim 12 wherein said computer network utilizes a hypertext data format and wherein said instruction means stored in signal bearing media for, in response to selecting a help request associated with said software application, automatically converting said help request into a data format readable by said computer network, utilizes said hypertext data format.

14. The computer program product of claim 12 wherein said help database and said advanced knowledge base reside on a network server, said network server residing on said computer network and wherein said instruction means stored in signal bearing media for dynamically supplementing and updating said help database utilizing said advanced knowledge base, utilizes said network server.

15. The computer program product of claim 14 further comprising:
   instruction means stored in signal bearing media for installing said help package as an HTML help file on said network server.

16. The computer program product of claim 15 further comprising:
   instruction means stored in signal bearing media for launching said help request via an application help button, said application help button residing on said data processing system, said application help button including a HTTP pathname.

17. The computer program product of claim 12 wherein the instruction means stored in signal bearing media for, in response to selecting a help request associated with said software application, automatically converting said help request into a data format readable by said computer network, comprises:
   instruction means stored in signal bearing media for selecting a help request resident on a graphical user interface, said graphical user interface residing on a display device within said data processing system;
   instruction means stored in signal bearing media for launching said selected help request from said data processing system; and
   instruction means stored in signal bearing media for automatically converting said help request into a hypertext data format.

* * * * *